July 29, 1930.  B. A. MITCHELL  1,771,806

TRANSMISSION

Filed April 19, 1928  2 Sheets-Sheet 1

Fig. 2.

Patented July 29, 1930

1,771,806

UNITED STATES PATENT OFFICE

BENJAMIN A. MITCHELL, OF NEW YORK, N. Y.

TRANSMISSION

Application filed April 19, 1928. Serial No. 271,139.

This invention relates to variable-speed transmission devices in which power is transmitted from the driving member to the driven member through the operation of a gyratory member. The object of the invention is to provide an improved transmission of this type of comparatively simple construction and of high efficiency. In the improved transmission the gyratory member is freely movable about its axis of gyration, in the manner of a gyratory pendulum, and the impeller, actuated by the driving shaft, acts resiliently upon the gyratory member, the contact member of the impeller being pressed by a spring in a radial direction against the gyratory member. The invention will be more fully explained hereinafter with reference to the accompanying drawings in which it is illustrated and in which:

Figure 2:
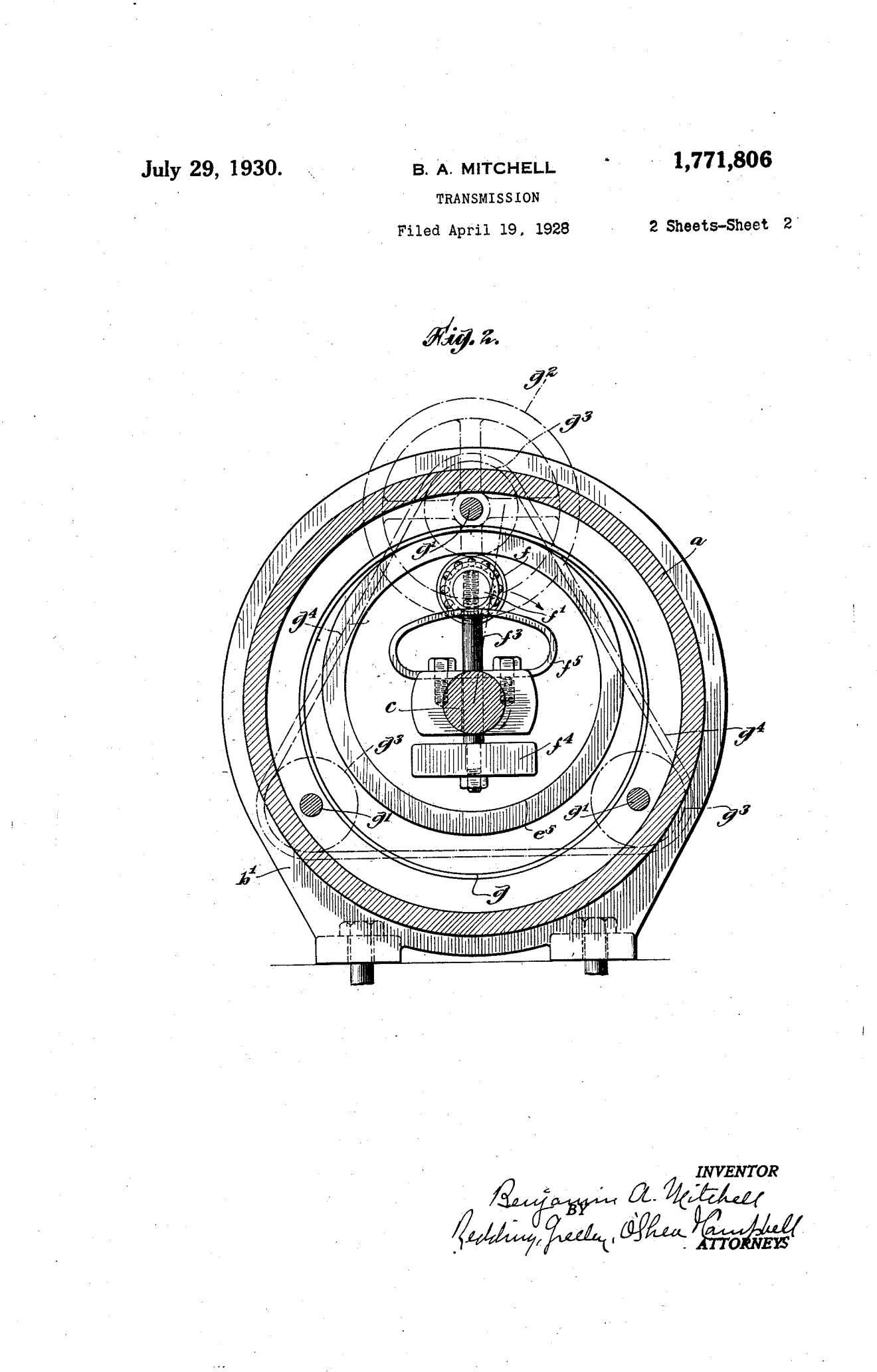

Figure 2 is a view of the same in transverse section on the plane indicated by the broken line 2—2 of Figure 1.

Figure 1:
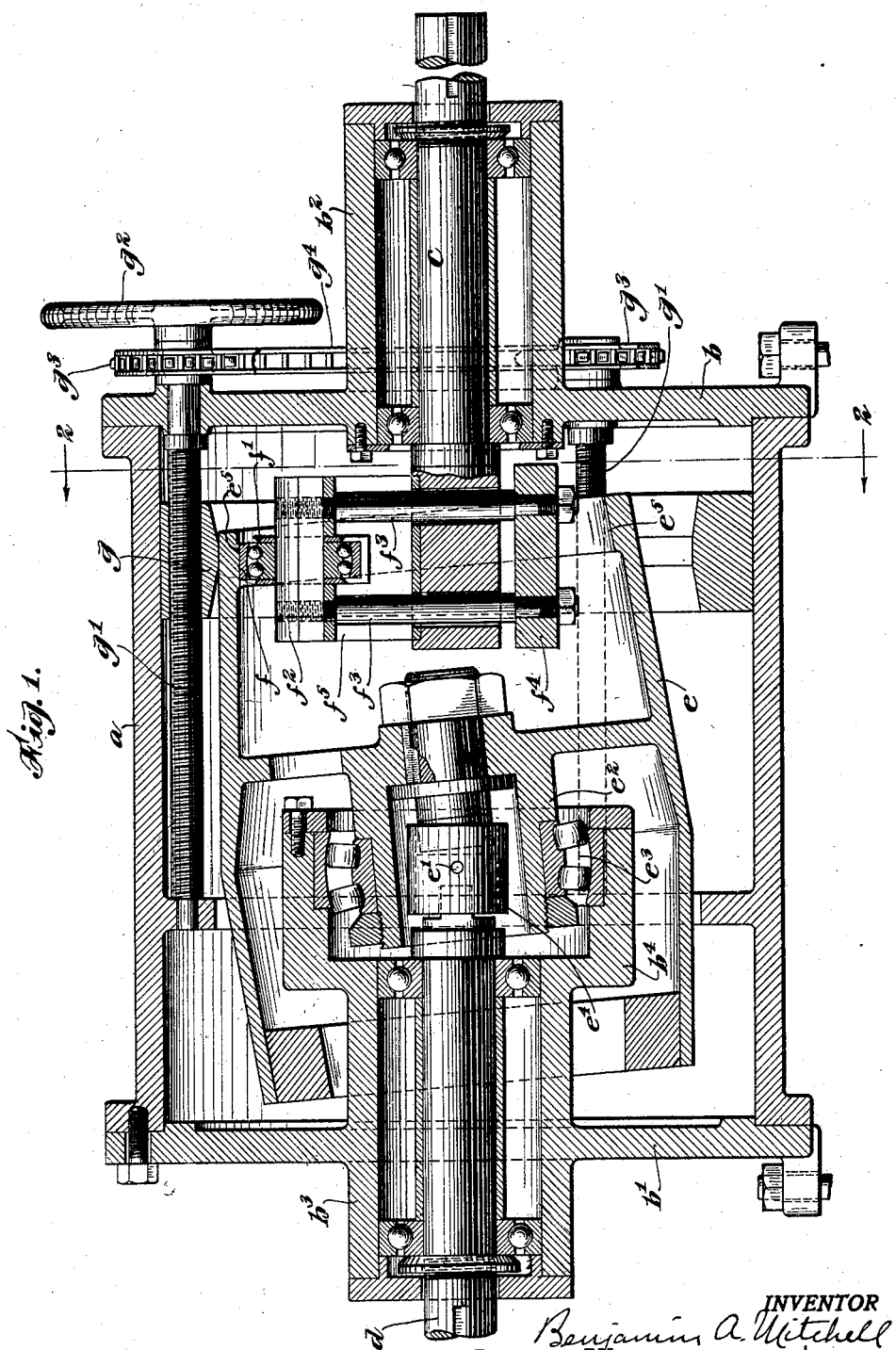
Figure 1 is a view in longitudinal sectional elevation of a form of transmission in which the invention is embodied.

In the embodiment of the invention illustrated in the drawings the several working parts are supported by a housing which comprises a cylindrical portion $a$ and end plates $b$ and $b^1$. The driving shaft $c$ is supported in suitable bearings in a cylindrical extension $b^2$ from the end plate $b$, and the driven shaft $d$ is similarly supported in an extension $b^3$ of the end plate $b^1$. A frusto conical gyratory member $e$ is supported so as to have a free movement of gyration about its axis of gyration, indicated at $e^1$, preferably being supported, through its hub $e^2$ and a self-aligning anti-friction bearing $e^3$, in an enlargement $b^4$ at the inner end of the extension or hub $b^3$ of the end of the plate $b^1$. The gyratory member is operatively connected with the driven shaft $d$ through a universal coupling $e^4$ which may be of any usual or suitable construction.

In the embodiment of the invention illustrated the impeller is arranged to rotate within the circumscribing shell of the gyratory member $e$, having a contact roller $f$, adapted for contact with a track $e^5$ formed on the inner surface of the shell of the gyratory member $e$. This roller is supported by a self-aligning anti-friction bearing $f^1$ on a block $f^2$ which is carried by radial rods $f^3$. The latter pass freely through the driving shaft $c$ and at their other ends carry a weight $f^4$ which counterbalances the mass of the impeller on the other side of the driving shaft, including a spring $f^5$ which is interposed between the shaft $c$ and the block $f^2$, thus holding the roller resiliently in operative relation with the gyratory member $e$.

Also, in the embodiment of the invention illustrated the gyratory member $e$ is shown as having contact externally with a circular, circumscribing track $g$. For the purpose of effecting variation in speed between the driving member and the driven member of the transmission, the track $g$ is made adjustable in position longitudinally with respect to the axis of gyration of the gyratory member. As shown, it is carried by three screws $g^1$, which may be actuated together through the medium of a hand wheel $g^2$ on one of the screw shafts, sprocket wheels $g^3$ on the several shafts, and a common sprocket chain $g^4$.

Assuming now that the driving shaft is rotated in a clockwise direction and that the impeller is carried with it in a clockwise direction, it will be understood that by reason of the lead which the contact roller $f$ has with respect to the point of contact of the roller against the track $e^5$ of the gyratory member an over-turning moment will be exerted about the point of contact of the roller and the track, which tends to compress the spring $f^5$ and also tends to increase as the point of contact of the roller with the track of the gyratory member moves beyond the radial line of the point of contact of the gyratory member with the coacting circular track $g$, which is held in a relatively fixed position, that is, against rotation in its own plane. In this manner, the gyratory member will be caused to roll against the track $g$ and thereby to acquire a rotation about its own axis in a counter-clockwise direction, which rotation will be imparted, through the coupling $e^4$, to the driven shaft $d$. The speed of rotation of the driven member will have the same ratio to the speed of rotation of the driving member as the ratio of the diameter of the relatively fixed circular track $g$ and the diameter of the gyratory member in the line of contact with the track. The speed ratio thus becomes variable through the shifting of the relatively fixed track $g$ in a longitudinal direction with respect to the axis of the gyratory member.

I claim as my invention:

1. A transmission comprising a driving member, a driven member, a gyratory member free to gyrate about its axis of gyration in the manner of a gyratory pendulum, a universal coupling between the gyratory member and the driven member, a radially movable rod carried by the driving member, a roller supported by said rod for contact with the gyratory member, a spring arranged to press the roller against the gyratory member, and a relatively fixed circular track for cooperation with the gyratory member.

2. A transmission comprising a driving member, a driven member, a hollow gyratory member free to gyrate about its axis of gyration in the manner of a gyratory pendulum, a universal coupling between the gyratory member and the driven member, a spring pressed impeller carried by the driving member for contact with the internal track of the gyratory member, and a relatively fixed circular track circumscribing the gyratory member for contact therewith.

3. A transmission comprising a circular housing, end plates therefor, a driving shaft mounted in one of the end plates, a driven shaft mounted in the other end plate, a gyratory member supported within the housing by the second named end plate, a universal coupling between the gyratory member and the driven shaft, a spring pressed impeller carried by the driving shaft, means to hold the impeller resiliently in cooperative relation with the gyratory member, and a relatively fixed circular track supported by the housing for cooperation with the gyratory member.

4. A transmission comprising a driving member, a driven member, a member mounted to gyrate about a fixed point in the manner of a gyratory conical pendulum, a universal coupling between the gyratory member and the driven member, an impeller carried by the driving member, means to hold the impeller resiliently in cooperative relation with the gyratory member, and a relatively fixed circular track for cooperation with the gyratory member.

5. A transmission comprising a driving member, a driven member, a member mounted to gyrate about a fixed point in line with the axis of the driving and driven members in the manner of a gyratory pendulum, a universal coupling between the gyratory member and the driven member, an impeller carried by the driving member, means to hold the impeller resiliently in cooperative relation with the gyratory member, and a relatively fixed circular track for cooperation with the gyratory member.

6. A transmission comprising a driving member, a driven member, a member mounted to gyrate about a fixed point in the manner of a gyratory conical pendulum, a universal coupling between the gyratory member and the driven member, power imparting means carried by the driving member for cooperation with the gyratory member, resilient means for holding the power imparting means in operative relation with the gyratory member, and a relatively fixed circular track for cooperation with the gyratory member.

7. A transmission comprising a driving member, a driven member, a hollow frusto conical member mounted to gyrate about a fixed point in the manner of a gyratory conical pendulum, a universal coupling between the gyratory member and the driven member, spring pressed power imparting means carried by the driving member for cooperation with the gyratory member and a circular track supported by the housing for cooperation with the surface of the inclined sides of the gyratory member.

8. A transmission comprising a driving member, a driven member, a hollow conical gyratory member mounted to gyrate about a fixed point in the manner of a gyratory conical pendulum in an orbit of constant diameter, a universal coupling between the gyratory member and the driven member, spring pressed bearing means for maintaining the driving member and the gyratory member in operative relation, and a relatively fixed circular track for cooperation with a surface of the inclined sides of said hollow conical gyratory member.

This specification signed this 26th day of March, A. D. 1928.

BENJAMIN A. MITCHELL.